United States Patent
Maxera et al.

(10) Patent No.: US 11,123,813 B2
(45) Date of Patent: Sep. 21, 2021

(54) BLADE FOR RECIPROCATING SAW

(71) Applicant: voestalpine Precision Strip GmbH, Boehlerwerk (AT)

(72) Inventors: Franz Maxera, Ybbsitz (AT); Bernhard Leeb, St. Peter in der Au (AT); Jakob Prodinger, Wieselburg (AT)

(73) Assignee: voestalpine Precision Strip GmbH, Boehlerwerk (AT)

(*) Notice: Subject to any disclaimer, the term of this patent is extended or adjusted under 35 U.S.C. 154(b) by 14 days.

(21) Appl. No.: 16/567,483

(22) Filed: Sep. 11, 2019

(65) Prior Publication Data

US 2020/0078878 A1     Mar. 12, 2020

Related U.S. Application Data

(60) Provisional application No. 62/729,698, filed on Sep. 11, 2018.

(30) Foreign Application Priority Data

Mar. 1, 2019 (EP) .................................. 19160385

(51) Int. Cl.
    *B23D 61/12*       (2006.01)

(52) U.S. Cl.
    CPC ......... *B23D 61/126* (2013.01); *B23D 61/121* (2013.01); *B23D 61/125* (2013.01); *B23D 61/127* (2013.01)

(58) Field of Classification Search
    CPC Y10T 83/9319; B23D 61/125; B23D 61/121; B23D 61/126; B23D 61/127; B23D 61/12
    See application file for complete search history.

(56) References Cited

U.S. PATENT DOCUMENTS

| | | | | |
|---|---|---|---|---|
| 3,630,699 A | | 12/1971 | Catlin | |
| 4,920,652 A | * | 5/1990 | Johnson | B23D 59/04 30/166.3 |
| 5,544,643 A | * | 8/1996 | Bauer | B23D 61/028 125/12 |
| 7,222,555 B2 | * | 5/2007 | Funakubo | B23D 51/01 51/295 |

(Continued)

FOREIGN PATENT DOCUMENTS

| | | |
|---|---|---|
| EP | 3323542 | 5/2018 |
| PL | 67608 | 2/2015 |

OTHER PUBLICATIONS

European Search Report for European Patent Application No. 19160385.1, dated Sep. 19, 2019, 8 pages.

*Primary Examiner* — Phong H Nguyen
(74) *Attorney, Agent, or Firm* — Day Pitney LLP; George N. Chaclas

(57) ABSTRACT

A blade for a reciprocating saw, said blade being made from at least a bimetallic sheet material and comprising a flat body portion comprising a low-alloy steel material or a carbon steel material, a cutting edge portion comprising a high-speed steel material provided with a plurality of teeth arranged at a first edge of said flat body portion, and a back edge portion arranged at a second edge of said flat body portion opposite of said cutting edge portion, wherein said back edge portion is provided with a non-cutting microstructured surface.

15 Claims, 3 Drawing Sheets

(56) References Cited

U.S. PATENT DOCUMENTS

| | | | |
|---|---|---|---|
| 2008/0276470 A1 | 11/2008 | Ritter et al. | |
| 2010/0011594 A1* | 1/2010 | Wysk | B23B 51/0406 |
| | | | 30/345 |
| 2010/0218389 A1* | 9/2010 | Kalomeris | B28D 1/127 |
| | | | 30/392 |
| 2013/0174701 A1 | 7/2013 | Elliston et al. | |
| 2014/0000117 A1* | 1/2014 | Novak | B23D 61/126 |
| | | | 30/353 |
| 2017/0014959 A1* | 1/2017 | Nicolson | B23D 61/12 |

* cited by examiner

BLADE FOR RECIPROCATING SAW

BACKGROUND OF THE INVENTION

The present invention relates to saw blades and, more particularly, to a blade for a reciprocating saw.

Reciprocating saws are utilized to cut various types of materials, particularly metallic, wooden or plastic materials. Therefore, a reciprocating saw is a standard hand-held power tool found on most worksites. A reciprocating saw comprises a reciprocating drive member which includes a chuck or a clamp or any other suitable adapter that releasably engages one end of an exchangeable reciprocating saw blade.

The saw blade typically comprises a flat body portion which includes one or more attachments portions and a cutting edge portion which is provided with a plurality of teeth. The cutting edge portion is arranged at one edge of the flat body portion. The saw blade also has a back edge portion arranged at an opposite edge of the cutting edge portion. Conventional saw blades for a reciprocating saw are provided with a flat back edge portion.

The durability of the teeth of the cutting edge portion is limited and, owing to the harsh conditions, under which a reciprocating saw is typically used, the saw blade of such power tools must be replaced frequently.

In order to provide for a more versatile use of power tools, it has been suggested to allow not only standard saw blades to be attached to the drive member but also other types of attachments such as rasps, chisels or sanding paddles which are then operated in a reciprocating manner by the drive member as well. Typical examples of a power tool with changeable attachments are described in US patent application US 2008/0276470 A1. Still, the power tool described in this document requires frequent changes between saw blades and other types of attachments in accordance with the requirements at the worksite.

European patent application EP 3 323 542 A1 describes another suggestion to increase the versatility of a reciprocating saw blade. In this document, it has been suggested to provide one edge of the saw blade with a cutting edge portion provided with rough teeth and the opposite edge with a cutting edge portion having finer teeth. Depending on the specific requirements at the worksite, the user can mount the saw blade in a first orientation for use the first cutting edge and in a second orientation for using the second cutting edge. Changing the orientation of the saw blade requires disengaging and engaging the saw blade which is a risky endeavor because both edges of the flat body of the blade are provided with cutting teeth.

A similar saw blade having two cutting edges is described in US 2013/0174701 A1. In certain embodiments, one of the cutting edges of the saw blade of US 2013/0174701 A1 can also comprise an abrasive surface or grit in order to be effective for any of numerous different cutting applications.

In Polish utility model PL 67 608 Y1, a saw blade having two teethed cutting edges is described. The teeth heights can vary in the longitudinal direction of the blade.

It is therefore one object of the present invention to provide a saw blade for a reciprocating saw which increases the safety of the user when handling the saw blade.

It is a further object of the present invention to increase the versatility of a reciprocating saw blade.

SUMMARY OF THE INVENTION

In one embodiment, the invention provides a blade for a reciprocating saw, said blade being made from at least a bimetallic sheet material and comprising a flat body portion comprising a low-alloy steel material or a carbon steel material, a cutting edge portion comprising a high-speed steel material provided with a plurality of teeth arranged at a first edge of the flat body portion, and a back edge portion arranged at a second edge of said flat body portion opposite of said cutting edge portion. According to the invention, the back edge portion is provided with a non-cutting micro-structured surface.

In the context of the present invention, a "non-cutting micro-structured surface" is surface having structures which do not exhibit machining properties, specifically no cutting or sawing properties, when the back edge portion of the blade is moved across the surface of a workpiece. Rather, the surface structures are designed to exhibit deburring properties when the back edge portion of the blade moved across the surface of a workpiece. Usually, for deburring it will be necessary to apply a blade with a certain force onto the workpiece.

In the context of the present invention, the term "deburring" refers to removing unwanted material, rough edges, ridges or chips left on a workpiece by the action of a tool or machine, especially by the action of the teethed cutting edge portion of a saw blade.

In the present application, the term "micro-structured" denotes structures having vertical dimensions, i.e. heights perpendicular to the surface plane, which fall within the micrometer (sub-millimeter) range. As will be outlined below, the term "micro-structured" can also comprise structures which extend in a longitudinal direction of the blade beyond the micrometer range well into the millimeter range.

The micro-structured surface of the back edge portion provides a safety feature because it allows the user to securely grip the saw blade when attaching it to the power tool or during replacement operation because the saw blade of the present invention provides a better grip than the flat back edge portion of conventional saw blades. The micro-structured surface of the back edge portion is not a teethed surface, thus reducing the risk of injury when handling the blade.

The micro-structured surface can have an irregular structure, i.e. having alternating projections and depressions of varying heights and lengths. Preferably, however, the micro-structured surface has a regular structure comprising a regularly repeated pattern of defined projections and depressions extending in the longitudinal direction of the blade.

According to one embodiment of the invention, the micro-structured surface comprises structures having a height between 10 and 450 µm. The height of the surface structures is determined by the distance between a peak of a projection of the structure and an adjacent valley/bottom of a depression of the structure. While it is not excluded that the micro-structured surface might be provided with even smaller structures below the claimed range, smaller structures would not be functional in providing the desired effect. In another embodiment, the structures have a height between 50 and 400 µm and in a further embodiment, the structures have a height between 100 and 300 µm.

Each projections can have a length in the longitudinal direction of the blade which is comprised between 200 and 5000 µm, preferably between 500 and 3000 µm. Likewise, the depressions can have a length in the longitudinal direction of the blade which is comprised between 100 and 5000 µm, preferably between 200 and 2000 µm. The length of a projection or depression is determined between subsequent points on the longitudinal profile where the height of the profile corresponds to 50% of the total height. In certain embodiments, the micro-structured surface comprises projections having a length which is longer than the length of the depressions thus providing a support surface for the back edge of the blade. In these embodiments, a second type of shorter projections can be provided which extend beyond the height of the longer projection.

In embodiments where the micro-structured surface is provided with a regularly repeated pattern of longitudinal projections and depressions, more than one type of projections and depressions, e.g. depressions differing in height and/or length, can be comprised in the pattern. In any case, in a regular surface structure, the heights and lengths of corresponding projections and depressions in the subsequent patterns will typically not differ by more than 10%.

According to one embodiment of the invention, the micro-structured surface is an abrasive surface allowing the back edge portion of the blade to be used for deburring residual edge chipping or edge deformation in the material worked by the cutting edge of the saw blade. Accordingly, the saw blade of the present invention can act as a conventional reciprocating saw with its teethed cutting edge portion and as a rasp, file or chisel with its micro-structured back edge portion. This double function can be obtained without having to manipulate the blade within the power tool, i.e. no safety hazards are involved. Rather, when moving the power tool with the attached blade of the invention in one direction (e.g. downward), the cutting edge portion of the reciprocating blade will act as a saw on the workpiece in order to obtain a cut. Any undesired raised edges or small pieces of material which may remain at the cutting surface of the workpiece can be removed immediately after the initial cutting operation by moving the power tool with the saw blade of the present invention in the opposite direction (e.g. upward) allowing the reciprocating micro-structured back edge of the blade to act as deburring tool removing these residues and thus increasing the quality of the obtained cutting surface of workpiece.

The projections of the micro-structured surface (or the case of more than one type of projections, the projections having the largest height) act as deburring elements. To this effect, the projections are designed as non-cutting elements. Accordingly, the projections are tailored such that they are not provided with sharp cutting points and/or are not provided with a clearance angle. Rather, the longitudinal profile of the projections is preferably provided with leading and trailing edges which exhibit an obtuse angle, i.e. an angle larger than 90°.

Whether the micro-structured surface will act as an abrasive surface, will depend on both the material properties of the back edge portion of the blade and the material to be worked by the blade of the present invention. Usually, the body portion of reciprocating saw blades is made from a metal material which is flexible and elastic in order to allow the saw blade to bend during operation and to absorb and withstand the associated tensile stresses. These materials have only limited wear resistance so that a backing edge portion made from the same material as the body portion can only act as a deburring tool when workpieces made from softer materials are treated. It common practice to harden the cutting edge portion of a saw blade in order to increase the wear resistance of the saw teeth, the cutting edge portion of the blade is usually hardened. Similarly, in order to increase the abrasive characteristics of the back edge portion of the saw blade of the present invention, the micro-structured back edge portion can be hardened as well, e.g. by thermal treatment.

Since the requirements with regard to toughness and bending strength of the body portion of the saw blade on the one hand and wear resistance of the saw teeth of the cutting edge portion on the other hand can only be satisfied insufficiently by a single material, for example a metal or a metal alloy, saw blades are often made from so-called bimetallic bands or bimetallic sheets. Such bimetallic bands or sheets usually consist of a flat, sheet-like body portion of a base material which has the necessary toughness and flexible strength, for example of low-alloy steels or carbon steels. A wire or strip of a cutting edge material, which has a greater wear resistance than the base material, is welded onto a narrow edge of the sheet-like base. An edge wire of high-speed steel (HSS) is typically used as a suitable cutting edge material. Therefore, the blade of the invention is made from a bimetallic sheet material, with said body portion comprising a low-alloy steel material or a carbon steel material and said cutting edge portion comprising high-speed steel material. In this embodiment, the back edge portion provided with the micro-structured surface is made from the same material as the flat body portion. Saw teeth are cut into the HSS cutting edge portion of the bimetallic sheet prior to a final hardening treatment. Similarly, the mirco-structures of the back edge surface will usually be formed prior to the final hardening treatment. The final hardening treatment required for the HSS portion will be preferably applied to the bimetallic sheet as a whole, thus hardening the back edge portion as well in order to increase the abrasive characteristics of the micro-structured surface.

In another embodiment, the invention provides for a reciprocating saw blade which is made from a trimetallic sheet material, with said flat body portion comprising a low-alloy steel material or a carbon steel material, said cutting edge portion comprising a high-speed steel material and said back edge portion comprising a tool steel material. Preferably, the tool steel material used for the back edge portion can also be a high-speed steel material. In this embodiment, a micro-structured back edge portion can be obtained which has a higher wear resistance compared to a back edge portion made from low-alloy steel or carbon steel. The trimetallic sheet material is a sheet having a low-alloy steel material/a carbon steel material at its center and high-speed steel material/tool steel material at its edges. The high-speed steel material used for the back edge portion can be the same high-speed steel material used for the cutting edge portion or a different alloy can be employed.

For the flat body portion, all carrier/backing materials commonly used for bimetallic or trimetallic saws can be employed. For example, usual low-alloy steels, which have great toughness and fatigue strength, may be used. Suitable sheet-like bases have for example a chemical composition in the range of 0.2-0.6% C, 0.1-1.0% Si, 0.3-2.0% Mn, 0.5-7.0% Cr, 0.1-2.6% Mo, up to 0.6% V and up to 5.0% W. Small additions of Nb and Ti in the range of up to 0.5% in total may be admixed for grain refinement. Iron and smelting-induced impurities form the remainder. Carbon steel with 0.50 to 1.50% C, up to 1.5% Si and up to 1.5% Mn may be used as the base material.

For the cutting edge and/or the back edge portions, all common HSS materials that are already used as wire for bimetal for saw blades or saw bands may for example be used, for instance S 2-10-1-8 (M42, 1.3247), S 6-5-2 (M2, 1.3343), or S 1-5-1-8 (MII, 1.3270).

In one embodiment, the micro-structured surface of the back edge portion is obtained by plastically deforming the surface using conventional metal-forming techniques such as rolling, embossing, indenting, die-forming or forging.

In embodiments, where the micro-structured surface of the back edge portion is obtained by plastic deformation, it is preferred that the back edge portion has a tapering cross-section. In these embodiments the width of the back edge portion decreases from a width at the base back edge portion corresponding to the width of the adjacent flat body portion towards a smaller width at the distal top of the back edge portion. In certain embodiments having an essentially flat or straight top, the width of the top of the back edge is preferably between 95% and 80% of the width of its base. In other embodiments the tapered top edge can be rounded, preferably moderately rounded, i.e. the radius of curvature of the rounded tip of the edge is preferably between 25% and 50% of the width of the base. Likewise, the sides of the tapering portion can be flat/straight or rounded, preferably concavely rounded. The tapering is designed such that upon plastic deformation no excess material protrudes beyond the width of the flat body portion. Otherwise, when plastically deformed areas of the back edge portion protrude beyond the width of the body portion, problems such as a telescope-like lateral displacement might occur during reeling of the micro-structured band material or during at packaging of the finalized teethed saw blades.

In another embodiment, the micro-structured surface is obtained by machining the surface of the back edge portion, for instance by using conventional mechanical cutting tools, laser cutting tools or water jet cutting tools.

In other embodiment, the micro-structured surface is obtained by adding material to the second edge of the flat body portion using an additive manufacturing technique, i.e. depositing material for forming the back edge portion onto said second edge. Typically, laser deposition techniques using a powder material composition can be employed.

In one embodiment, the micro-structured surface is obtained by partially embedding abrasive particles in said surface, for instance by partially melting the second edge of the flat body portion and directing a jet of abrasive particles to the melted section. A power comprising non-melting abrasive particles and melting metal particles, for instance made from the same material as the flat body portion, can also be employed. The abrasive particles can be selected from tool steel particles, ceramic particles, hard metal particles or combinations thereof. Metallic hard materials are borides, carbides, silicides and nitrides of high-melting transition metals, or else oxides in combination with workable microstructural constituents, i.e. a matrix in which the metallic materials are incorporated. Metallic hard materials include, for example, TiC, TaC, WC, $TiB_2$, $MoSi_2$, $Al_2O_3$, $SiO_2$), from which solid solutions (for example TiC—WC, $Mo_2C$—TiC), double carbides or complex carbides (for example $Co_3W_3C$, $Ni_3W_3C$) and intermetallic compounds can be derived. Furthermore, mixtures of HSS materials with metallic hard materials can also be considered for obtaining a micro-structured back edge surface. Average particle sizes of the abrasive particles range between 15 and 500 μm.

DETAILED DESCRIPTION OF THE DRAWINGS

Figure 1:
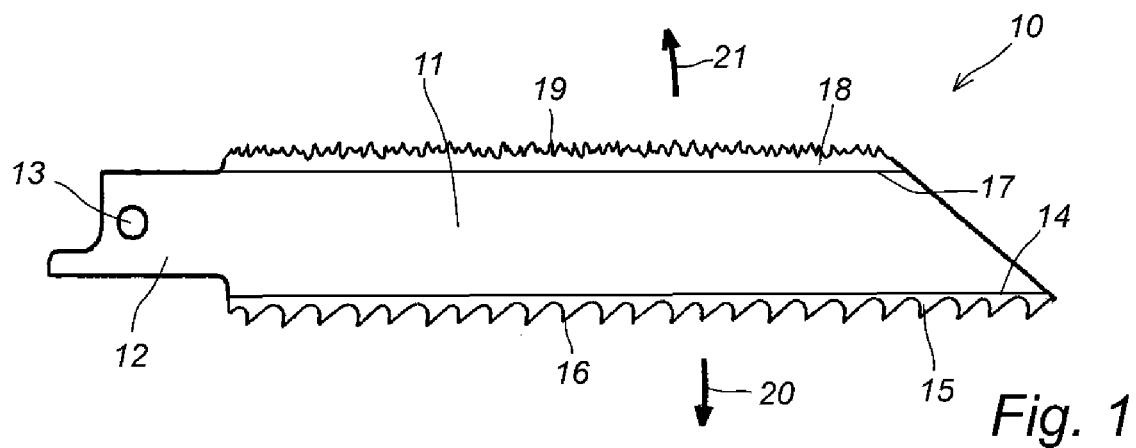
FIG. 1 is a side view of a saw blade for a reciprocating saw having a micro-structured surface.

FIG. 1 shows an exemplary embodiment of a saw blade 10 for a reciprocating saw having differently configured edges. Saw blade 10 comprises a flat body portion 11 extending on one and into a tang 12 for attaching the saw blade to a power tool. Tang 12 is provided with a conventional locking aperture 13. The body portion 11 has a first edge 14 at which a cutting edge portion 15 provided with teeth 16 is arranged. In the depicted embodiment, the teeth 16 are completely arranged within the cutting edge portion 15. It is, however, possible to arrange teeth 16 in such a manner that their teeth bases extend into the flat body portion 11 allowing the teeth to benefit both from the more flexible material of the flat body portion 11 and, at the teeth tips, from the harder material of the cutting edge portion 15. At a second edge 17 of the flat body portion 11, located opposite of the cutting edge portion 15, a back edge portion 18 of the saw blade is arranged. The back edge portion 18 is provided with a micro-structured surface 19. Accordingly, when operated in direction of arrow 20, the saw blade acts on a workpiece (not shown) as a cutting tool via its cutting edge portion 15. When operated in direction of arrow 21, the micro-structured back-edge portion 18 of blade 11 acts on the workpiece. As a can be taken from FIG. 1 and particularly from the enlarged view of FIG. 3A, a typical micro-structured surface 19 will exhibit sharp peaks 22 which can exhibit cutting or sawing properties when applied with force on to a workpiece.

Figure 2:
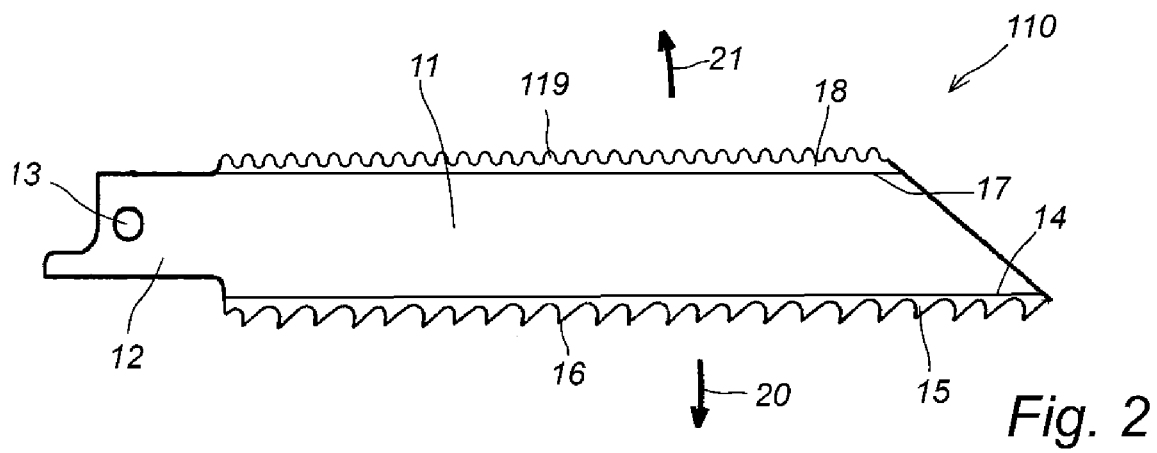
FIG. 2 is a side view of an embodiment of a saw blade for a reciprocating saw according to the invention.

FIG. 2 shows an exemplary embodiment of a saw blade 110 of the present invention. Saw blade 110 essentially corresponds to saw blade 10 depicted in FIG. 1 except that the micro-structured surface 119 of saw blade 110 exhibits a more regular surface structure. Elements, which correspond to elements already described in connection with the embodiment of FIG. 1 are denoted by the same reference signs and will not be described in detail again. As can be taken from FIG. 2, particularly in connection with the enlarged view of FIG. 3B, the micro-structured surface 119 of the blade of the present invention avoids peaks 122, which exhibit sharp points and/or points exhibiting a clearance angle. Consequently, the micro-structured surface 119 will not exhibit cutting or sawing properties. Rather, the micro-structured surface 119 provides both increased grip when handling the saw blade 10 and can act as deburring tool. Accordingly, when operated in direction of arrow 20, the saw blade acts as a cutting tool via its cutting edge portion 15. When operated in direction of arrow 21, blade 11 acts as a deburring tool via its micro-structured back edge portion.

Figure 3A:
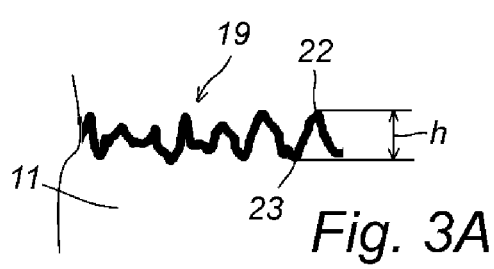
FIG. 3A is an enlarged detail of the back edge portion of the saw blade of FIG. 1.
Figure 3B:
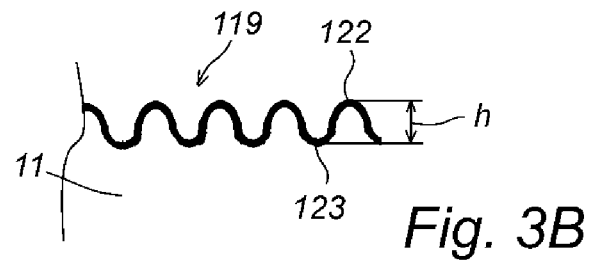
FIG. 3B is an enlarged detail of the back edge portion of the saw blade of FIG. 2.

FIGS. 3A and 3B are enlarged details of the back edge portion of the saw blade of FIGS. 1 and 2, respectively. As can be taken therefrom, the height h of the structures provided on the back edge portions 19, 119, respectively, are determined as the distance between peaks and adjacent valleys/bottoms of the structures. For instance, a height h in FIG. 3A corresponds to the distance between peak 22 and valley/bottom 23 while height h in the embodiment of FIG. 3B corresponds to the distance between peak 122 and valley/bottom 123. In the regular pattern of FIG. 3B, the height distribution is quite narrow, while the irregular surface structure of the embodiment of FIG. 3A exhibits a broader distribution of structure heights. Likewise, the radii of the curvature of the peaks in the embodiment of FIG. 3A exhibited large distribution of radii. Consequently, in this embodiment, a large number of peaks will be quite sharp and might even exhibit clearance angles so that conventional micro-structured surface will exhibit cutting or sawing properties. In contrast, the blade of the invention as shown in FIG. 3B has a micro-structured back edge portion which is specifically designed to avoid sharp peaks with cutting or sawing properties.

FIG. 4 shows four alternatives of cross-sectional views of the back edge portion and the flat body portion (partly) of the blade before the micro-structures are applied to the back edge portion. Accordingly, as shown in FIG. 4A, the back edge portion can have a rectangular profile 24. In another embodiment, as shown in FIG. 4B, the back edge portion has a rounded profile 25. FIG. 4C shows a further embodiment where the back edge portion has a tapering cross-section 26 having an edge which is smaller in width than the width of the flat body portion. In the embodiment of FIG. 4C, the sides 27, 28 and the top 29 of the back edge portion are straight/flat. FIG. 4D shows an alternative embodiment of a tapering back edge portion having a cross-section 30 where the sides 31, 32 of the back edge portion are concavely curved while the top 33 is flat.

FIGS. 5, 6 and 7 show exemplary embodiments of back edge portions of the blades according to the invention having a more regular micro-structured surface, i.e. similar to the embodiment of FIG. 2.

Figure 5A:
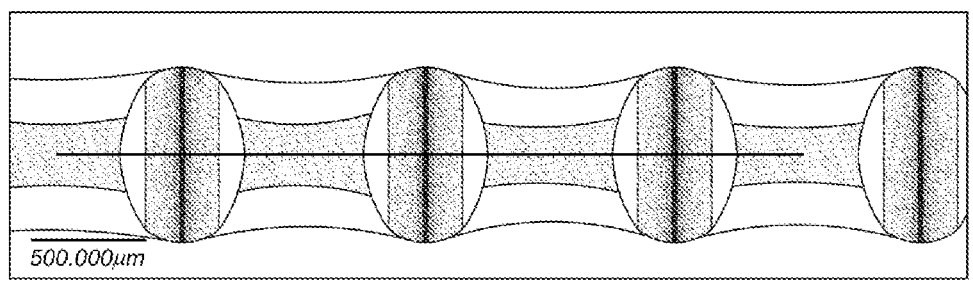
FIG. 5A is a top view of the back edge portion of one embodiment of the invention.
Figure 5B:
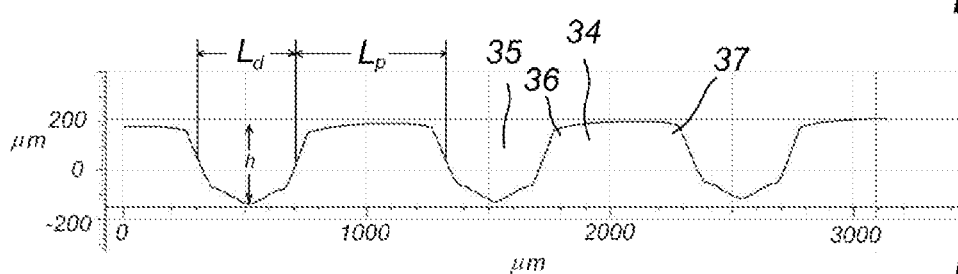
FIG. 5b is a depth profile of the back edge portion of FIG. 5A.

FIG. 5A is a microscopic photograph of a top view of the back edge portion of one embodiment of the invention where structures obtained by a regularly repeating pattern of projections 34 and depressions 35 having a typical height h of approximately 280 μm are obtained by a metal-forming process such as embossing. The depressions 35 have a length $L_d$ of approximately 400 μm while the projections have a length $L_p$ of approximately 600 μm, determined at 50% of height h of the structure. As can also be taken from FIG. 5A, the projections are provided with an obtuse angle at their leading edges 36 and trailing edges 37, respectively, and do not exhibit a clearance angle. Accordingly, the projections can act as deburring elements. A corresponding depth profile measured along the black center line of FIG. 5A is depicted in FIG. 5B.

Figure 6A:
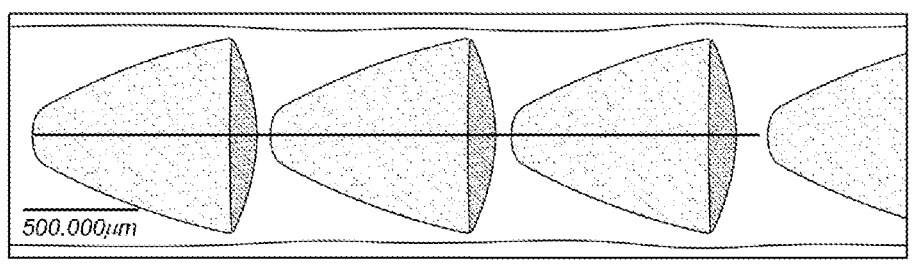
FIG. 6A is a top view of the back edge portion of another embodiment of the invention.
Figure 6B:
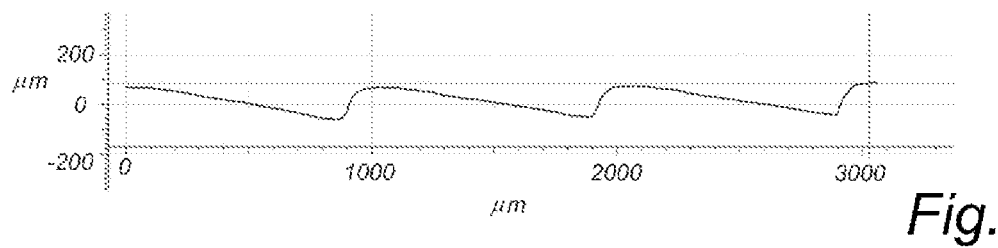
FIG. 6B is a depth profile of the back edge portion of FIG. 6A.

An alternative surface structure, also obtained by embossing, and a corresponding depth profile is depicted in FIGS. 6A and 6B, respectively. As can be taken therefrom, the structures of the micro-structured surface have a typical height of approximately 130 μm. Again, the depth profile of FIG. 6B is obtained along the black center line of FIG. 6A.

Figure 7A:
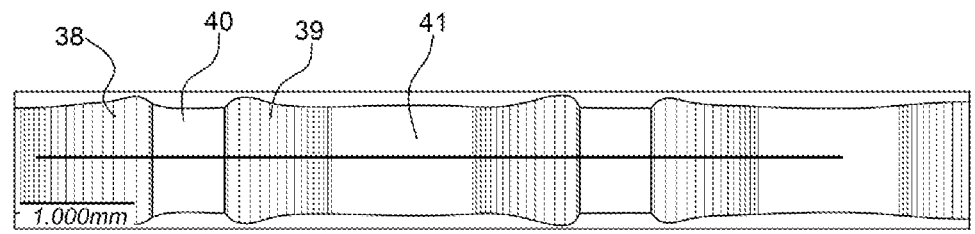
FIG. 7A is a top view of the back edge portion of a further embodiment of the invention.
Figure 7B:
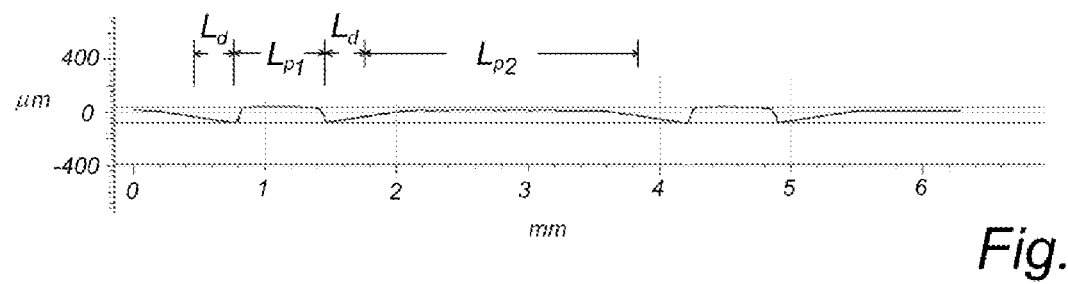
FIG. 7B is a depth profile of the back edge portion of FIG. 7A.

Yet another alternative surface structure which is also obtained by embossing and its corresponding depth profile are depicted in FIGS. 7A and 7B, respectively. In this embodiment, the edge of the back edge portion comprises micro-structures having typical height of approximately 120 μm. Two types of depressions 38, 39 and two types of projections 40, 41 are provided in a repeating pattern. The depressions 38, 39 are mirror images of each other and have a length $L_d$ of approximately 300 μm each. The projections 40, 41 have different lengths and slightly different heights. The length $L_{p1}$ of projections 40 is approximately 650 μm, while the length $L_{p2}$ of projections 41 is approximately 2000 μm. The longer projection 41 acts as a support surface while the shorter projection 40 is slightly higher that projection 40 thus extending beyond the upper surface of projection 41 and acting as a deburring element. As can be seen from the depth profile of FIG. 7B, both projections 40 and 41 exhibit non-cutting obtuse-angled leading and trailing edges.

Figure 4A:
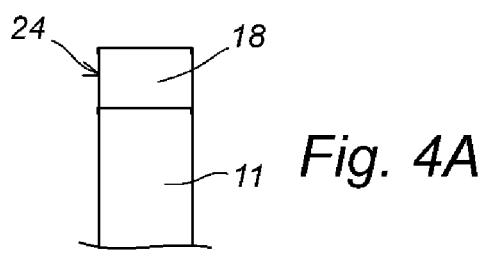
FIG. 4A shows a cross-sectional view of body portion and back edge portion of a saw blade from which the saw blade of FIG. 2 can be formed.
Figure 4B:
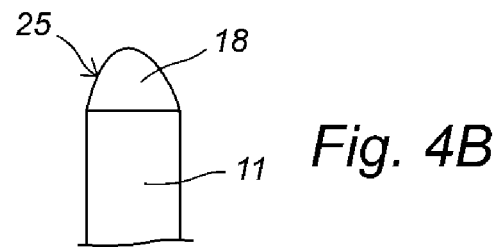
FIG. 4B shows a cross-sectional view of body portion and back edge portion of an alternative embodiment of FIG. 4A.
Figure 4C:
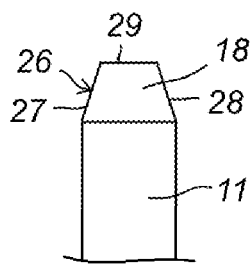
FIG. 4C shows a cross-sectional view of a body portion and a back edge portion of a further embodiment of FIG. 4A.
Figure 4D:
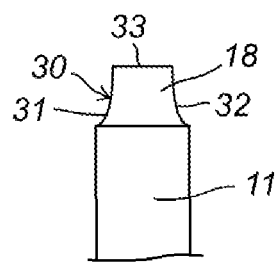
FIG. 4D shows a cross-sectional view of yet another embodiment of FIG. 4A.

The micro-structured surfaces of the embodiments of FIGS. 5A, 5B and 6A, 6B are obtained from back edge portions exhibiting a rectangular cross-section as shown in FIG. 4A while the micro-structured surfaces of the embodiments of FIGS. 7A, 7B is obtained from a back edge portion exhibiting a taping cross-section as shown in FIG. 4D. As can be taken from the top view photographs of FIGS. 5A, 6A and 7A, respectively, the embossed depression obtained from the tapering back edge portion of the embodiment of FIG. 7A, 7B exhibit a lower degree of lateral broadening and do not extend beyond the width of the body portion of the blade.

Figure 8:
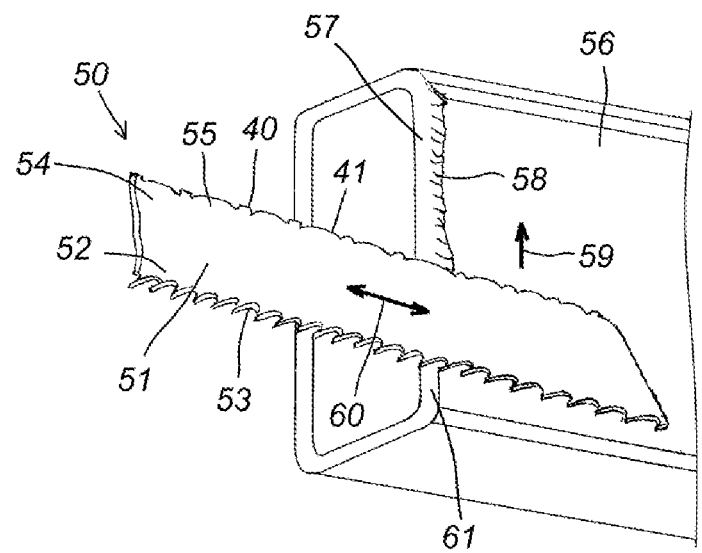
FIG. 8 shows the application of the saw blade of the present invention in deburring operation.

FIG. 8 shows a schematic embodiment of a saw blade of the present invention in a deburring operation. The saw blade 50 is provided with a flat body portion 51, a cutting edge portion 52 having teeth 53 and a back edge portion 54 which exhibits are micro-structured surface 55 according to the embodiment of FIG. 7A, 7B. Accordingly, the micro-structured surface 55 is provided with two types of projections, namely shorter, slightly higher projections 40 which act as deburring elements and longer, slightly lower projections 41 which act as supporting elements (see also FIG. 7A). As shown in the FIG. 8, the saw blade 50 is applied to a workpiece 56 which has an edge 57 which exhibits a rough surface 58 as a result of a previous sawing operation of blade 50 with its cutting edge portion 52. The back edge portion 54 of blade 50 is used as a deburring tool by moving it over the rough surface 58 in the direction indicated by arrow 59 while simultaneously driving the saw blade 50 in reciprocating manner (indicated by arrow 60) in the longitudinal direction of the blade. The resulting surface 61 of edge 57 is free of burrs. Accordingly, with the blade of the present invention, the operator can saw and deburr the resulting cut in a single up- and down movement of the blade without requiring additional deburring tools.

The invention claimed is:

1. A blade for a reciprocating saw, said blade being made from at least a bimetallic sheet material and comprising
    a flat body portion comprising a low-alloy steel material or a carbon steel material,
    a cutting edge portion comprising a high-speed steel material provided with a plurality of teeth arranged at a first edge of said flat body portion, and
    a back edge portion arranged at a second edge of said flat body portion opposite of said cutting edge portion, wherein said back edge portion is provided with a non-cutting micro-structured surface, said micro-structured surface being an abrasive surface for deburring provided with projections and depressions, said projections being provided with leading and trailing edges, wherein the projections are configured as non-cutting elements which exhibit no clearance angle or wherein the leading and trailing edges of the projections exhibit an obtuse angle.

2. The blade of claim 1, wherein said micro-structured surface comprises structures having a height between 10 and 450 µm.

3. The blade of claim 1, wherein said micro-structured surface comprises structures having a height between 50 and 400 µm.

4. The blade of claim 1, wherein said micro-structured surface comprises structures having a height between 100 and 300 µm.

5. The blade of claim 1, wherein the length of the projections is comprised between 200 and 5000 µm.

6. The blade of claim 1, wherein said blade is made from a trimetallic sheet material, said flat body portion comprising a low-alloy steel material or a carbon steel material, said cutting edge portion comprising a high speed steel material and said back edge portion comprising a tool steel material, such as a high speed steel material.

7. The blade of claim 1, wherein said micro-structured surface of said back edge portion is obtained by plastically deforming said surface using a metal forming technique.

8. The blade of claim 7, wherein said back edge portion has a tapered cross-section.

9. The blade of claim 1, wherein said micro-structured surface of said back edge portion is obtained by machining said surface.

10. The blade of claim 1, wherein said micro-structured surface of said back edge portion is obtained by adding material to said second edge of said flat body portion using an additive manufacturing technique.

11. The blade of claim 10, wherein said micro-structured surface of said back edge portion is obtained by partially embedding abrasive particles in said surface.

12. The blade of claim 11, wherein said abrasive particles are selected from tool steel particles, ceramic particles, hard metal particles or combinations thereof.

13. The blade of claim 12, wherein said hard metal particles are made from tungsten carbide, titanium carbide, or tantalum carbide.

14. The blade of claim 12, wherein said abrasive particles have an average size comprised between 15 and 500 µm.

15. A blade for a reciprocating saw, said blade being made from at least a bimetallic sheet material and comprising
a flat body portion comprising a low-alloy steel material or a carbon steel material,
a cutting edge portion comprising a high-speed steel material provided with a plurality of teeth arranged at a first edge of said flat body portion, and
a back edge portion arranged at a second edge of said flat body portion opposite of said cutting edge portion, wherein said back edge portion is provided with a non-cutting micro-structured surface, said micro-structured surface being an abrasive surface for deburring provided with projections and depressions, said projections being provided with leading and trailing edges,
wherein the projections are configured as non-cutting elements which exhibit no clearance angle.

* * * * *